Dec. 20, 1960    H. G. BRAENDEL    2,965,423
PISTON RING ASSEMBLY
Filed June 15, 1960

*INVENTOR.*
HELMUTH G. BRAENDEL
BY *Arthur H. Seidel*
ATTORNEY

United States Patent Office 2,965,423
Patented Dec. 20, 1960

2,965,423

PISTON RING ASSEMBLY

Helmuth G. Braendel, Malvern, Pa., assignor to Wilkening Manufacturing Co., Philadelphia, Pa., a corporation of Delaware Filed June 15, 1960, Ser. No. 36,337

5 Claims. (Cl. 309—44)

The present invention relates to a piston ring assembly, and more particularly to a piston ring assembly adapted to be installed in piston ring grooves on a piston.

The efficiency and fuel comsumption of an internal combustion engine are greatly affected by the construction of piston rings. Recent designs of piston ring grooves include drain passages which are substantially parallel to the peripheral surface of the piston, thereby eliminating a major portion of the bottom wall of the grooves. Thus, conventional piston rings cannot be utilized since the expander will drop through the drain passage.

It is an object of the present invention to provide a novel piston ring assembly.

It is another object of the present invention to provide a piston ring assembly capable of being used in piston ring grooves wherein the drain passage eliminates a major portion of the bottom wall of the groove.

It is another object of the present invention to provide a piston ring assembly which is less susceptible to plugging and provides for increased passage of oil with the least amount of radial obstruction.

Other objects will appear hereinafter.

For the purpose of illustrating the invention there is shown in the drawings a form which is presently preferred; it being understood, however, that this invention is not limited to the precise arrangements and instrumentalities shown.

Figure 1:
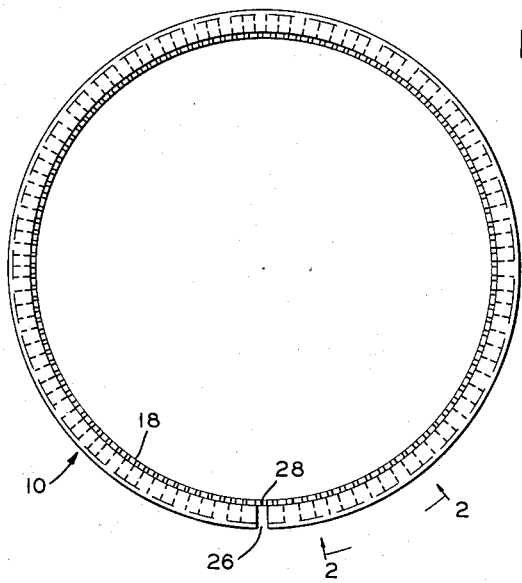
Figure 1 is a plan view of the piston ring assembly of the present invention.

Referring to the drawings in detail, wherein like numerals indicate like elements, there is shown in Figure 1 a piston ring assembly 10.

The piston ring assembly 10 is adapted to be disposed within a groove 14 in a piston 12. The piston 12 is provided with a drain passage 16 which is substantially parallel to the peripheral surface of the piston 12 and thereby eliminates substantially the whole back half of the bottom wall of the groove 14.

Figure 3:
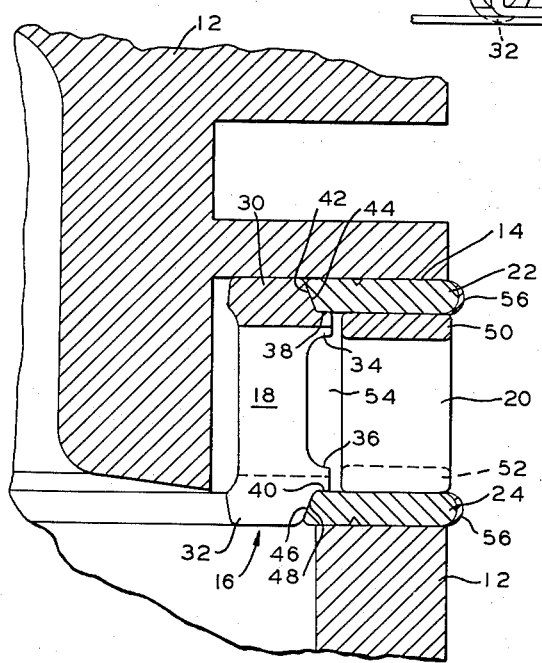
Figure 3 is an enlarged partial cross-sectional view of a piston with the piston ring assembly of the present invention disposed within a groove on said piston.

The piston ring assembly 10, as seen more clearly in Figure 3, comprises an expander 18, a spacer 20, a top rail 22, and a bottom rail 24. The piston ring assembly 10 is annular in shape, as shown more clearly in Figure 1, and is provided with a gap 26. The gap 26 extends through the spacer 20, the top rail 22, and the bottom rail 24. The ends of the expander 18 are in abutment as shown in Figure 1 at 28. Thus, the expander 18 extends a full 360 degrees while each of the spacer 20, top rail 22, and bottom rail 24 are provided with spaced ends defining the gap 26.

Figure 2:
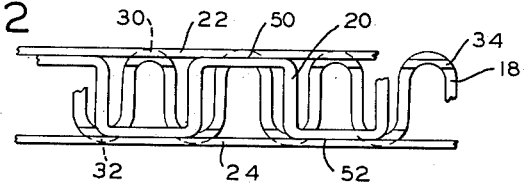
Figure 2 is a partial side elevational view of the piston ring assembly taken along the lines 2—2 in Figure 1.

The expander 18 is sinuously corrugated throughout its length thereby forming top peaks 30 and bottom peaks 32. As seen more clearly in Figures 2 and 3, the top peaks 30 and the bottom peaks 32 are provided with flanges 34 and 36 respectively. The inner peripheral surface of the top peaks 30 and the bottom peaks 32 are substantially intermediate the upper and lower surfaces on the flanges 34 and 36. The upper surface 38 on the flange 34 forms a horizontally disposed shoulder. The bottommost surface 40 on the flange 36 provides a horizontally disposed shoulder.

The peaks 30 on the expander 18 are provided with a tapered surface 42 extending from the surface 38 to the uppermost surface on the peaks 30. The top rail 22 is provided with a tapered surface 44 which matingly engages the tapered surface 42. Thus, the innermost end of the top rail 22 rests on the surface 38 with the tapered surfaces 42 and 44 in mating engagement.

The bottom peaks 32 on the expander 18 are provided with a tapered surface 46 extending from the surface 40 to the lowermost surface of the peaks 32. The innermost end of the bottom rail 24 engages the surface 40 and is provided with a tapered surface 48 which matingly engages the tapered surface 46.

The spacer 20 is sinuously corrugated throughout its length thereby forming top peaks 50 and bottom peaks 52. The distance between adjacent top peaks 50 is approximately twice the distance between adjacent peaks 30 so that every second peak 50 on said spacer 20 is in phase with a peak 30 on said expander 18. The vertical distance between the top peaks 50 and the bottom peaks 52 on the spacer 20 is substantially less than the distance between the top peaks 30 and the bottom peaks 32 on the expander 18. The top rail 22 rests on the top peaks 50 of the spacer 20. The rail 22 has a thickness whereby the uppermost surface of the top rail 22 is substantially flush with the uppermost surface of the top peaks 30 on the expander 18.

The bottom rail 24 is juxtaposed to the lowermost surface of the bottom peaks 52 and is of such a thickness so that the lowermost surface on the bottom rail 24 is substantially flush with the lowermost surface on the bottom peaks 32 of the expander 18. As seen more clearly in Figure 3, the tapered surfaces 42, 44, 46 and 48 converge toward the spacer 20. Thus, the abutting engagement between surface 40 and the bottom rail 24 in conjunction with the mating tapered surfaces 46 and 48 cooperate to prevent the expander 18 from dropping through the drain passage 16.

The expander 18 is spaced from the spacer 20 by a gap 54. The tap 54 permits circumferential flow of oil thereby preventing the formation of pockets immediately above the bottom peaks 32 on the expander 18. The sinuous corrugations of the spacer 20 and the expander 18 permits greater flow of oil in a radial direction.

When the piston ring assembly 10 is compressed, the tapered surfaces 42 and 46 on the expander 18 are matingly engaged with the tapered surfaces 44 and 48, respectively, on the top rail 22 and the bottom rail 24. As the expander 18 tends to expand, the surfaces 42 and 46 impart a tangential force which biases the top rail 22 and the bottom rail 24 in a radial and axial direction. The spacer 20 maintains the top rail 22 and the bottom rail 24 in spaced alignment. I have found that the piston ring assembly 10 has improved stability, improved side loading for better sealing, and the top rail 22 and the bottom rail 24 hug the sides of the piston groove 14 in a superior manner under high vacuum conditions.

The outer peripheral surface of the rails 22 and 24 are preferably cured and plated with chrome plating 56 as shown in Figure 3 so as to have a durable line contact with the inner peripheral surface of the cylinder wall.

The present invention may be embodied in other specific forms without departing from the spirit or essential attributes thereof and, accordingly, reference should be made to the appended claims, rather than to the foregoing specification as indicating the scope of the invention.

I claim:

1. In a piston ring assembly comprising an expander sinuously corrugated, a spacer separate from said expander, said spacer being sinuously corrugated, a top rail on the top peaks of said spacer with said top rail being in abutting engagement with top peaks of said expander, a bottom rail juxtaposed to bottom peaks on said spacer with said bottom rail in abutting engagement with bottom peaks of said expander, and means on said expander for preventing said expander from moving in an axial direction.

2. In a piston ring assembly in accordance with claim 1 wherein said means includes a flange on the top and bottom peaks of said expander, said rails engaging said flanges with the uppermost surface of said top rail being substantially flush with the uppermost surface of the top peaks of said expander, and the lowermost surface of said bottom rail being substantially flush with the lowermost surface of the bottom peaks of said expander.

3. In a piston ring assembly in accordance with claim 2 wherein the inner peripheral surface on the top and bottom peaks of said expander is substantially intermediate the upper and lower surfaces of said flanges.

4. In a piston ring assembly in accordance with claim 1 wherein the abutting engagement between said rails and said expander comprises tapered surfaces on the top and bottom peaks of said expander and on said rails, said tapered surfaces converging toward said spacer.

5. In a piston ring assembly in accordance with claim 4 wherein said expander is radially spaced from said spacer thereby defining an axially extending gap permitting circumferential flow of oil.

References Cited in the file of this patent
UNITED STATES PATENTS
2,769,675    Hamm ------------------ Nov. 6, 1956